United States Patent Office
3,354,952
Patented Nov. 28, 1967

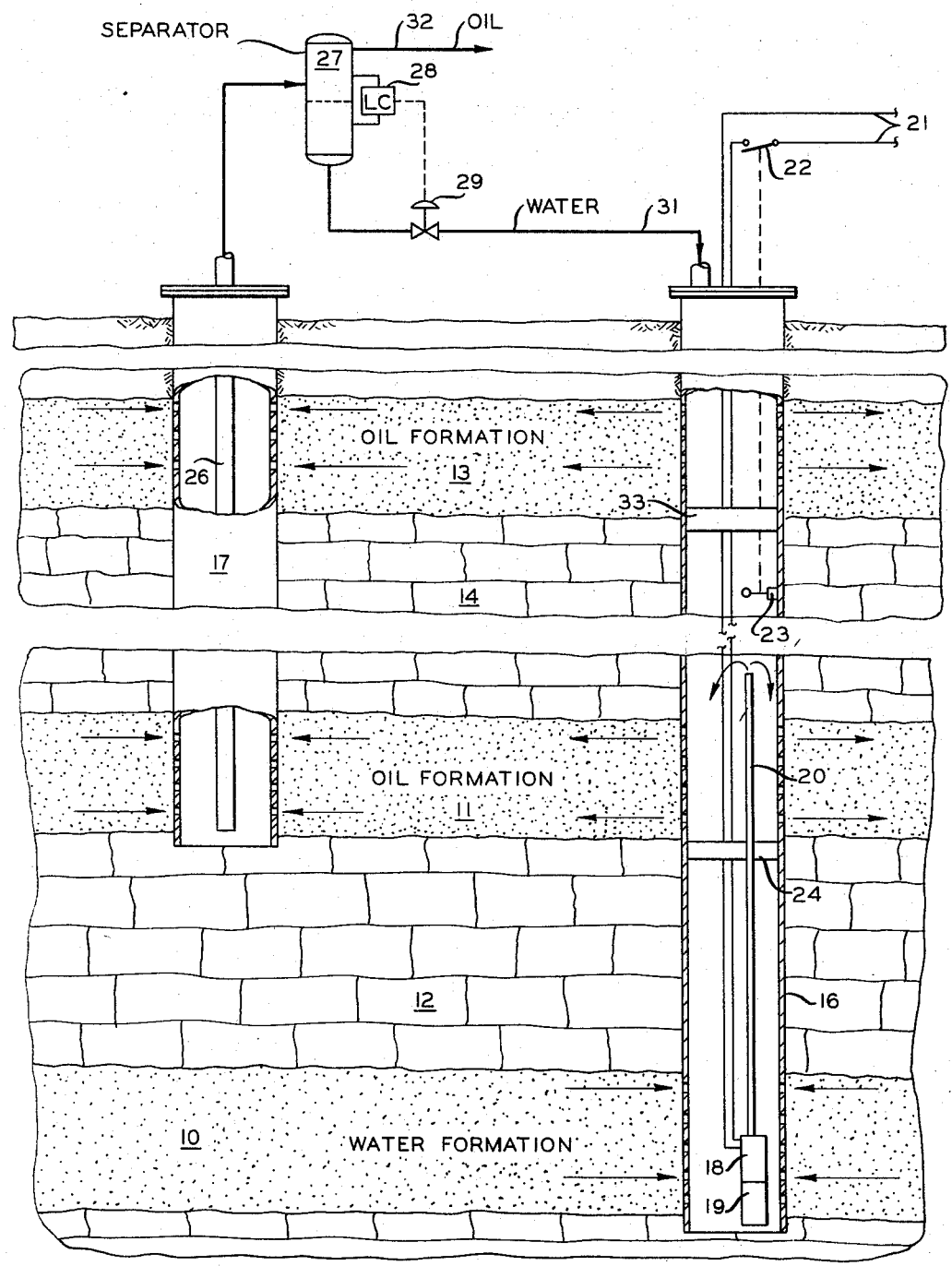

3,354,952
OIL RECOVERY BY WATERFLOODING
Charles J. Engle, Bartlesville, Okla., assignor to Phillips Petroleum Company, a corporation of Delaware
Filed Aug. 9, 1965, Ser. No. 478,380
8 Claims. (Cl. 166—7)

ABSTRACT OF THE DISCLOSURE

Oil is recovered from an oil-bearing formation by flooding same with water produced from a water-bearing formation situated below said oil-bearing formation. If desired, water and oil produced from said oil-bearing formation can be separated and the recovered water used to flood a second oil-bearing formation.

This invention relates to the recovery of hydrocarbons from an underground reservoir. In one aspect, this invention relates to methods of producing petroleum by either primary or secondary recovery techniques. In another aspect, this invention relates to methods of and apparatus for waterflooding an oil-bearing formation.

In the production of underground deposits of oil and gas by primary recovery methods, the reservoir energy is expended to carry the oil and gas to the surface. This energy can be obtained from an expanding gas cap within the reservoir, a solution-gas drive, or a water drive around the periphery of the reservoir. During this period of production, it is advantageous to replace the withdrawn oil and gas with another fluid which will serve to maintain the reservoir pressure as high as possible and thereby prolong the primary recovery life of the reservoir. In many cases, this can be accomplished by injecting water at strategic points throughout the reservoir. When the reservoir has been depleted to a point at which production would cease except for the result obtained from using the injected water, the reservoir is said to be in the secondary stage of production. In secondary recovery operations of this type, residual oil can be recovered by injecting water into a series of boreholes or wells surrounding a somewhat centrally located producing well for the purpose of effecting a migration of the residual oil from the reservoir rock to the producing well. This pattern of water injection and residual oil production can be repeated throughout the reservoir with the result that commercial quantities of oil can be economically produced.

When water is used as the injection fluid either during primary or secondary recovery operations, it is evident that large quantities of it must be available in order to yield a financial return from the operation. This can present a problem especially in arid or semiarid regions where the amount of surface water available is limited. The lack of water for injection purposes can lead to the abandonment of partially depleted reservoirs which could otherwise produce additional quantities of oil. Although sufficient quantities of water may be available in other areas, the water may not be suitable for reservoir injection because of the presence of entrained oxygen or the like which can create serious corrosion problems in the well casings and associated equipment. Foreign matter entrained in the water can also make it unfit for injection purposes because of the damaging effect the foreign matter can have on the reservoir rock.

According to this invention, these and other disadvantages of the prior art methods of waterflooding an oil-bearing reservoir during the primary or secondary recovery of oil therefrom are overcome by utilizing water from a water-beaing formation situated bleow the oil reservoir. In the practice of one embodiment of the invention, water is produced into a borehole from a water-bearing formation situated below the oil-bearing formation which is to be waterflooded. The produced water is lifted in the borehole to a height sufficient to provide a hydrostatic head of pressure on the oil-bearing formation which is greater than its formation pressure. This can be accomplished by pumping the water upward in the borehole or by utilizing the formation pressure of the water-bearing formation to lift the water. When the hydrostatic head of pressure obtained from the column of water in the borehole is greater than the formation pressure in the oil-bearing formation, the water gravitates downward in the borehole and passes outward therefrom into the oil-bearing formation thereby waterflooding it. This serves to force the oil away from the borehole to a recovery well in which it is lifted to the surface and separated from the oil and water mixture. If desired, the separated water can be returned to the borehole where it is reintroduced into the oil-bearing formation.

In another embodiment of the invention, water from a water-bearing formation is utilized to waterflood two oil-bearing formations situated above the water-bearing formation and separated from each other by a substantially impervious zone. In this embodiment of the invention, water from the water-bearing formation is produced into a first borehole and lifted upward to a height sufficient to provide a hydrostatic head of pressure greater than the formation pressure of the lower of the two oil-bearing formations. The water can be lifted in the borehole by either a pump or by the pressure in the water-bearing formation. When the hydrostatic head of pressure created by the column of water becomes greater than the formation pressure in the lower oil-bearing formation, the water passes outward from the first borehole into the lower oil-bearing formation. A recovery well in the form of a second borehole spaced from the first borehole can be used to recover the oil and water forced through the lower oil-bearing formation. This oil and water can be recovered from the second borehole by any suitable lifting means such as a pump or the like. The recovered mixture of oil and water can be separated into an oil phase and a water phase, and the water phase can be passed into the first borehole whereupon it passes downward in the first borehole and outward into the upper oil-bearing formation. The oil and water can be recovered from the upper oil-bearing formation in the second borehole in the same manner the oil and water mixture is recovered from the lower oil-bearing formation in the second borehole.

It is apparent that when water is obtained from a lower formation and passed directly to an upper oil-bearing formation in accordance with this invention, a successful waterflooding operation is accomplished regardless of the availability of water on the surface of the ground. By this invention, it is now possible to waterflood oil reservoirs which have been depleted by primary recovery methods and which have been impossible to produce by secondary recovery methods because of the unavailability of surface water.

An important advantage realized by utilizing water from a lower formation for waterflooding an upper oil-bearing formation is that the injection water has been filtered through the lower formation with the result that it is much cleaner and free of foreign material than is surface water. Moreover, since the water is passed directly from the lower formation to the upper oil-bearing formation, in accordance with a preferred embodiment of the invention, without coming in contact with air, it is less corrosive because of the absence of entrained oxygen.

If the water-bearing formation selected is a depleted oil-bearing reservoir, any residual oil in the water-bearing formation is recovered along with the oil-recovered from the oil-bearing formation. Although the residual oil in the water-bearing formation could not be produced economically by itself, its recovery in the manner described will increase the monetary return from the over-all operation.

Accordingly, it is an object of this invention to provide an improved method of waterflooding an oil-bearing formation to recover oil therefrom.

Another object of this invention is to provide a method of waterflooding an oil-burning formation with water from a lower formation without lifting the water above the surface of the ground.

A further object of this invention is to provide a method of waterflooding an oil-bearing formation which is less corrosive to the associated equipment than the methods of the prior art.

Still another object of this invention is to provide an improved apparatus for waterflooding an oil-bearing formation to recover oil therefrom.

These and other objects of the invention will become apparent to one skilled in the art after studying the following detailed description, the appended claims, and the accompanying drawing which schematically illustrates a broken vertical section through a water-bearing formation and two spaced upper oil-bearing formations penetrated by boreholes or wells.

The method of waterflooding an oil-bearing formation to recover oil therefrom in accordance with one embodiment of the invention comprises producing water into a first borehole from a water-bearing formation situated below the oil-bearing formation, lifting the water in the borehole to a height sufficient to provide a hydrostatic head of pressure greater than the formation pressure of the oil-bearing formation, and waterflooding the oil-bearing formation by allowing the water to pass outward from the borehole into the oil-bearing formation. A second borehole or recovery well spaced from the first borehole serves to receive the oil and water in the form of a mixture from the oil-bearing formation. This mixture is recovered at the surface by means of a pump or the like. In a modification of this embodiment of the invention, the oil and water recovered from the second borehole are separated at the surface into an oil phase and a water phase. The water phase is returned to the first borehole at the upper end thereof by a suitable connecting conduit. This water serves with the water obtained from the lower water-bearing formation for waterflooding the oil-bearing formation.

The method of waterflooding, in accordance with another embodiment of the invention, to recover oil from two separate oil-bearing formations separated by a substantially impervious formation comprises the steps of producing water into a first formation. The produced water is lifted as by a pump or the like in the first borehole to a height sufficient to provide a hydrostatic head of pressure which is greater than the formation pressure of the first oil-bearing formation. The waterflooding of the first oil-bearing formation is accomplished by allowing the water in the first borehole to gravitate downward therein and pass outward therefrom into the first oil-bearing formation. A second borehole spaced from the first borehole serves to receive the oil and water passing through the first oil-bearing formation from the first borehole. This oil and water are recovered from the second borehole by a pump or the like and separated into a water phase and an oil phase. The separated water phase is passed into the first borehole to form a column of water in the first borehole adjacent the upper second oil-bearing formation. When the hydrostatic head of pressure on the second oil-bearing formation is greater than the formation pressure of the second oil-bearing formation, the water flows outward from the first borehole through the second oil-bearing formation to the second borehole. This serves to effect a migration of the oil from the upper second oil-bearing formation into the second borehole whereupon it can be recovered with the oil from the first oil-bearing formation.

Referring now to the drawing, a water formation 10 is separated from a first oil-bearing formation 11 by a substantially impervious layer 12. A second oil-bearing formation 13 is situated above and separated from the oil formation 11 by at least one substantially impervious formation 14. A first borehole 16 passes through the several formations and is completed in the water formation such that water can be produced into the borehole. A second borehole 17 passes downward through the oil formation 13 and is completed in the oil formation 11. Both of the boreholes are provided with casing having a series of perforations which allows fluid communication with each of the several formations.

A motor 18 and a pump 19 is connected to a fluid conducting means in the form of a standpipe 20. The standpipe 20 including the motor 18 and pump 19 is suspended within the borehole 16 by any suitable means. The motor 18 is connected to a source of electrical power by means of conductors 21 through which current can be passed when switch 22 is moved to its closed position in response to a signal from a liquid level sensing means 23. A packer 24 positioned within borehole 16 near the bottom of the oil formation 11 serves to hold the water issuing from standpipe 19 to provide the hydrostatic head of pressure on the formation 11. The level sensing element 23 is positioned within the borehole 16 at a level which will dictate the hydrostatic head of pressure necessary to allow the water to pass into formation 11. When the level of the water contacts the liquid level element 23, switch 22 opens thereby stopping the flow of current to the motor 18 and hence the flow of water from standpipe 20. When the level of water has dropped within the borehole 16, the level sensing element 23 causes switch 22 to close thereby energizing motor 18. This serves to replenish the supply of water within borehole 16. Preferably, switch 23 includes an upper and lower level control which will allow for fluctuations in the water level without frequent starting and stopping of motor 18. Alternatively, the level sensing element 23 can be equipped with a time delay system which will allow for changes of the water level.

The oil and water passing through the oil formation 11 collect in the bottom of borehole 17 whereupon it is removed by a pump or the like through a string of tubing 26. An oil-water separator 27 is operatively attached to the tubing 26. A liquid level controller 28 connected to the separator 27 and valve 29 in line 31 serves to regulate the level of the water in separator 27. The oil recovered in the separator is removed by means of line 32. The water removed in line 31 can be passed to borehole 16 and stored above a packer 33.

In the operation of the embodiment of the invention wherein one oil formation is waterflooded, injection water from formation 10 is pumped upward in borehole 16 and maintained therein at a level which cooperates with the position of level sensing element 23 and which is sufficient to provide a hydrostatic head which will allow the water to pass outward through oil formation 11. This serves to cause a migration of the oil through the oil formation 11 to the borehole 17 whereupon it can be recovered and separated in separator 27. If desired, the separated water can be transmitted by line 31 into the upper end of borehole 16 and recirculated back through the oil formation 11 along with additional water from the water formation 10. In this modification of this embodiment of the invention, the packer 33 is eliminated.

In the embodiment of the invention wherein two separate oil formations are waterflooded, the water from formation 10 is pumped upward in borehole 16 by means of pump 19 to level 23 whereupon it passes outward into oil formation 11. The oil and water recovered in borehole 17 are separated in separator 27 and the water phase is passed into the upper end of borehole 16 whereupon it forms a column of water on top of packer 33. The hydrostatic head created by this water causes it to pass outward from borehole 16 through oil formation 13 into the upper end of borehole 17. The oil and water from formation 13 then are recovered and separated along with the oil and water from formation 11. The total separated water including that water obtained from formation 13 and from formation 11 then is passed to the upper end of borehole 16 for waterflooding formation 13.

When the injection water is obtained from a water formation 10 which contains residual amounts of oil, the residual oil therein can be recovered along with the oil from formations 11 and 13 thus making the entire method more attractive economically.

Although the invention is described in connection with waterflooding two separate formations positioned above the water formation, it is obvious that the method can be employed for waterflooding more than two formations if desired.

Although a pump is illustrated as being used for lifting the water from the lower water formation to provide the necessary hydrostatic head of pressure, it is obviously within the spirit and scope of the invention to employ the natural water formation pressure to provide the necessary head of fluid. It is also within the spirit of this invention to employ more than one recovery well spaced from the injection well. For example, it is possible to employ four or eight approximately equally spaced, circumferentially positioned wells around the injection well.

The invention has been described in considerable detail only for the purpose of illustration. It is obvious that many variations and modifications can be made by one skilled in the art without departing from the spirit and scope of the invention.

I claim:

1. A method of waterflooding an oil-bearing formation to recover oil therefrom comprising producing water into a borehole from a water-bearing formation situated below said oil-bearing formation; lifting said water within said borehole to a height below ground surface but which is sufficient to provide a hydrostatic head of pressure greater than the formation pressure of said oil-bearing formation; and waterflooding said oil-bearing formation by allowing the water to pass outward from said borehole directly into said oil-bearing formation.

2. A method of waterflooding according to claim 1 wherein the water is pumped upward in said borehole to provide the necessary hydrostatic head of pressure.

3. A method of waterflooding an oil-bearing formation to recover oil therefrom comprising producing water into a first borehole from a water-bearing formation situated below said oil-bearing formation; lifting said water within said first borehole to a height below ground surface but which is sufficient to provide a hydrostatic head of pressure greater than the formation pressure of said oil-bearing formation; waterflooding said oil-bearing formation by allowing said lifted water in said first borehole to pass outward therefrom directly into said oil-bearing formation; and recovering oil and water from said oil-bearing formation in a second borehole spaced from said first borehole.

4. A method according to claim 3 wherein the oil and water recovered in said second borehole are separated and the water is returned to said first borehole.

5. A method of waterflooding to recover oil from a first oil-bearing formation and a second oil-bearing formation spaced above said first formation by a substantially impervious formation comprising the steps of producing water into a first borehole from a water-bearing formation situated below said first oil-bearing formation; lifting the water in said first borehole to a height sufficient to provide a hydrostatic head of pressure greater than the formation pressure of said first oil-bearing formation; waterflooding said first oil-bearing formation by allowing the water in said first borehole to pass outward therefrom into said first oil-bearing formation; recovering oil and water from said first oil-bearing formation in a second borehole spaced from said first borehole; separating the oil and water recovered in said second borehole to produce a separated water phase and a separated oil phase; passing said separated water phase into said first borehole; and waterflooding said second oil-bearing formation by allowing said separated water phase in said first borehole to pass outward therefrom into said second oil-bearing formation.

6. A method according to claim 5 wherein oil and water in said second oil-bearing formation is recovered in said second borehole along with the oil and water recovered from said first oil-bearing formation.

7. A method according to claim 5 wherein the water is pumped upward in said first borehole to provide the necessary hydrostatic head of pressure to allow the water to pass outward into said first oil-bearing formation.

8. A method of waterflooding an oil-bearing formation by passing water from a lower water-bearing formation directly into said oil-bearing formation without bringing the water to the surface of the ground comprising producing water into a borehole from said water-bearing formation; lifting the water in said borehole to a height sufficient to provide a hydrostatic head of pressure greater than the formation pressure of said oil-bearing formation; and waterflooding said oil-bearing formation by allowing the water to pass outward from said borehole into said oil-bearing formation.

References Cited

UNITED STATES PATENTS

| 2,230,001 | 1/1941 | McConnell et al. | 166—9 |
| 2,357,703 | 9/1944 | Teichmann | 166—7 |
| 2,473,713 | 6/1949 | Kingston et al. | 166—4 X |
| 2,551,434 | 5/1951 | Gray et al. | 166—9 X |

FOREIGN PATENTS

| 625,020 | 9/1961 | Italy. |

CHARLES E. O'CONNELL, *Primary Examiner.*

JAMES A. LEPPINK, *Examiner.*